Figure 1:
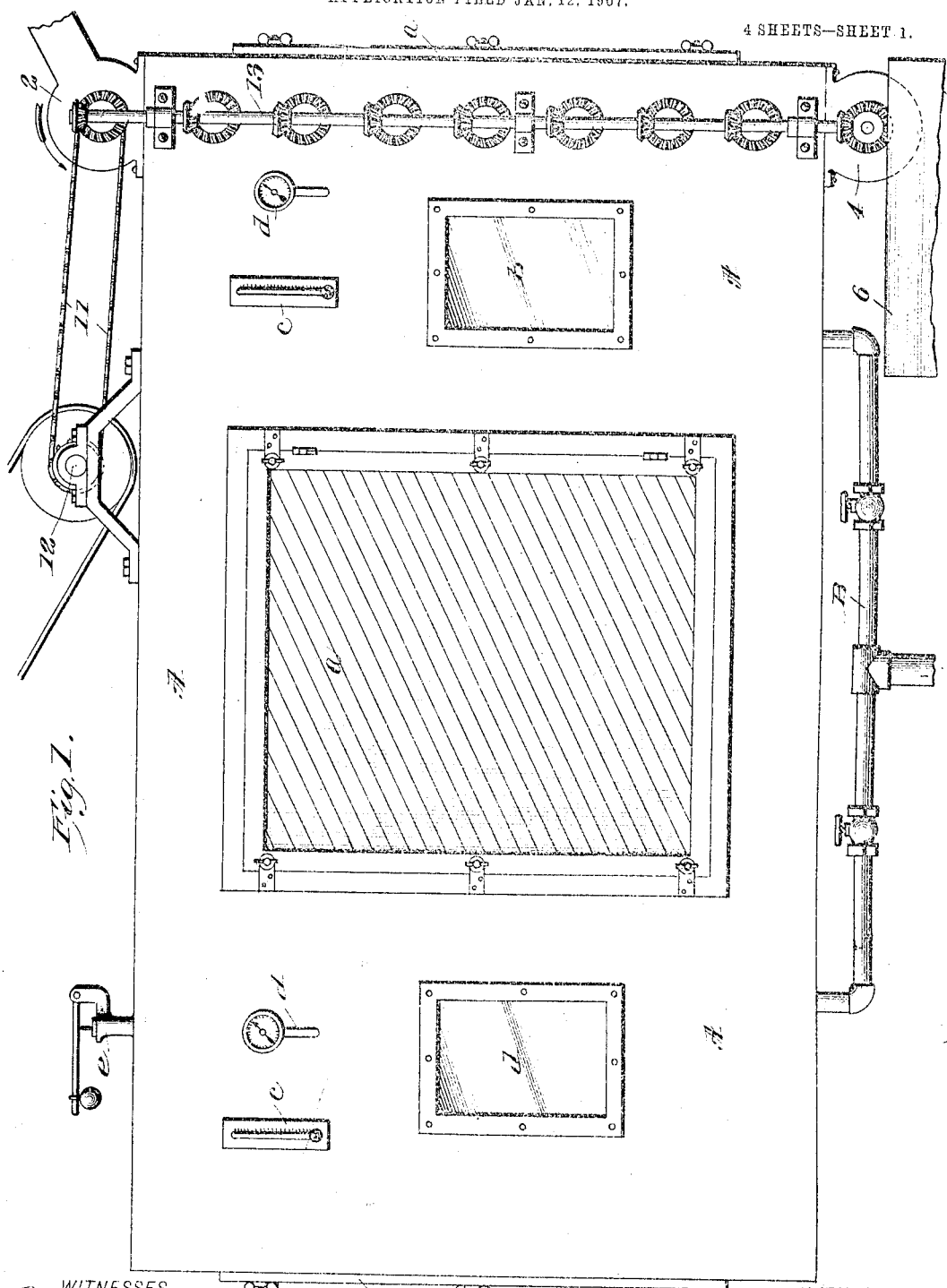

No. 851,511. PATENTED APR. 23, 1907.
L. S. FLECKENSTEIN.
APPARATUS FOR PROCESSING SUGAR CORN.
APPLICATION FILED JAN. 12, 1907.

4 SHEETS—SHEET 1.

WITNESSES
E. M. Callaghan

INVENTOR
LEONARD S. FLECKENSTEIN
BY Munn & Co.
ATTORNEYS

No. 851,511. PATENTED APR. 23, 1907.
L. S. FLECKENSTEIN.
APPARATUS FOR PROCESSING SUGAR CORN.
APPLICATION FILED JAN. 12, 1907.
4 SHEETS—SHEET 2.
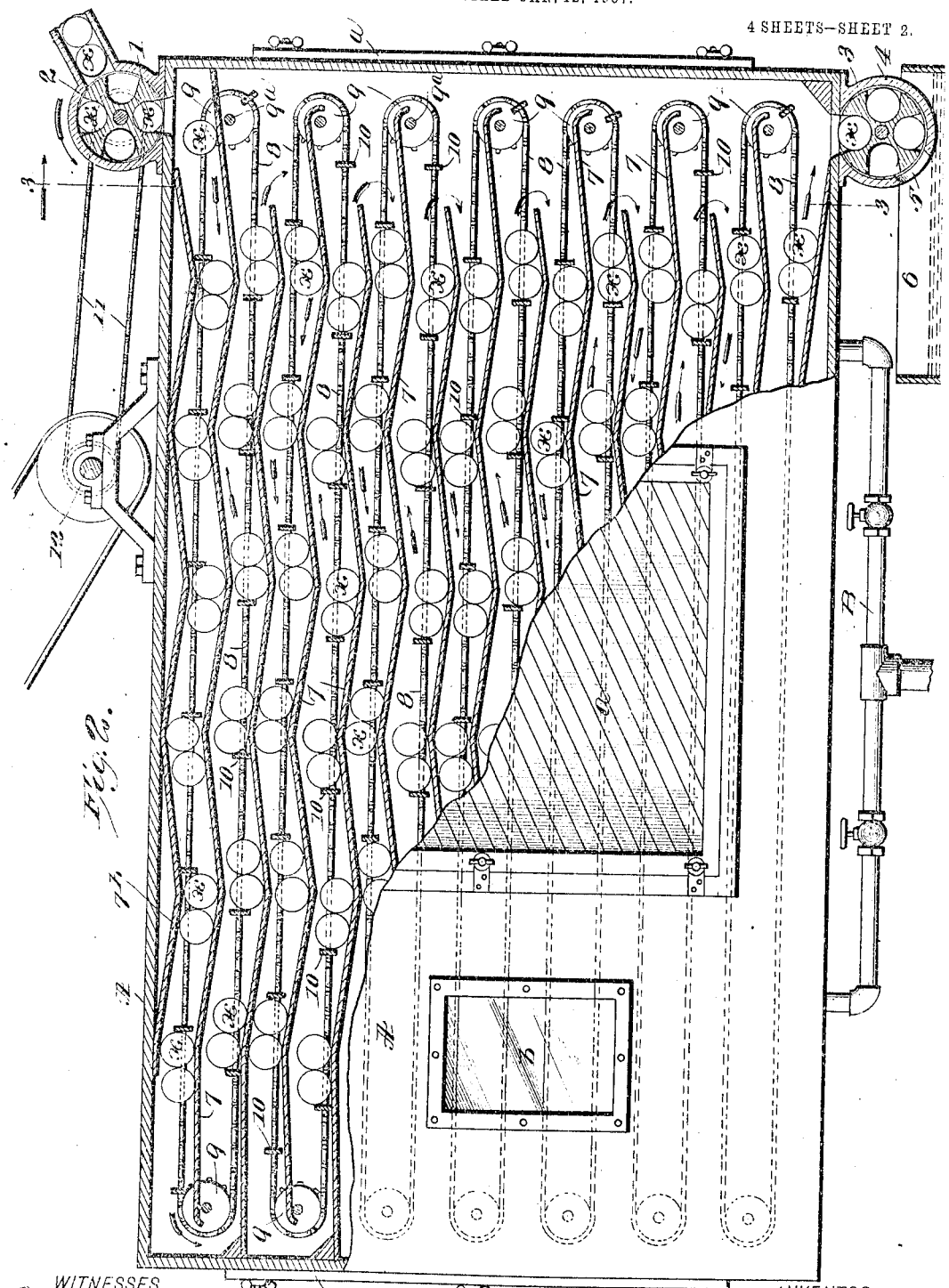
WITNESSES
INVENTOR
LEONARD S. FLECKENSTEIN
BY
ATTORNEYS No. 851,511. PATENTED APR. 23, 1907.
L. S. FLECKENSTEIN.
APPARATUS FOR PROCESSING SUGAR CORN.
APPLICATION FILED JAN. 12, 1907.
4 SHEETS—SHEET 3.
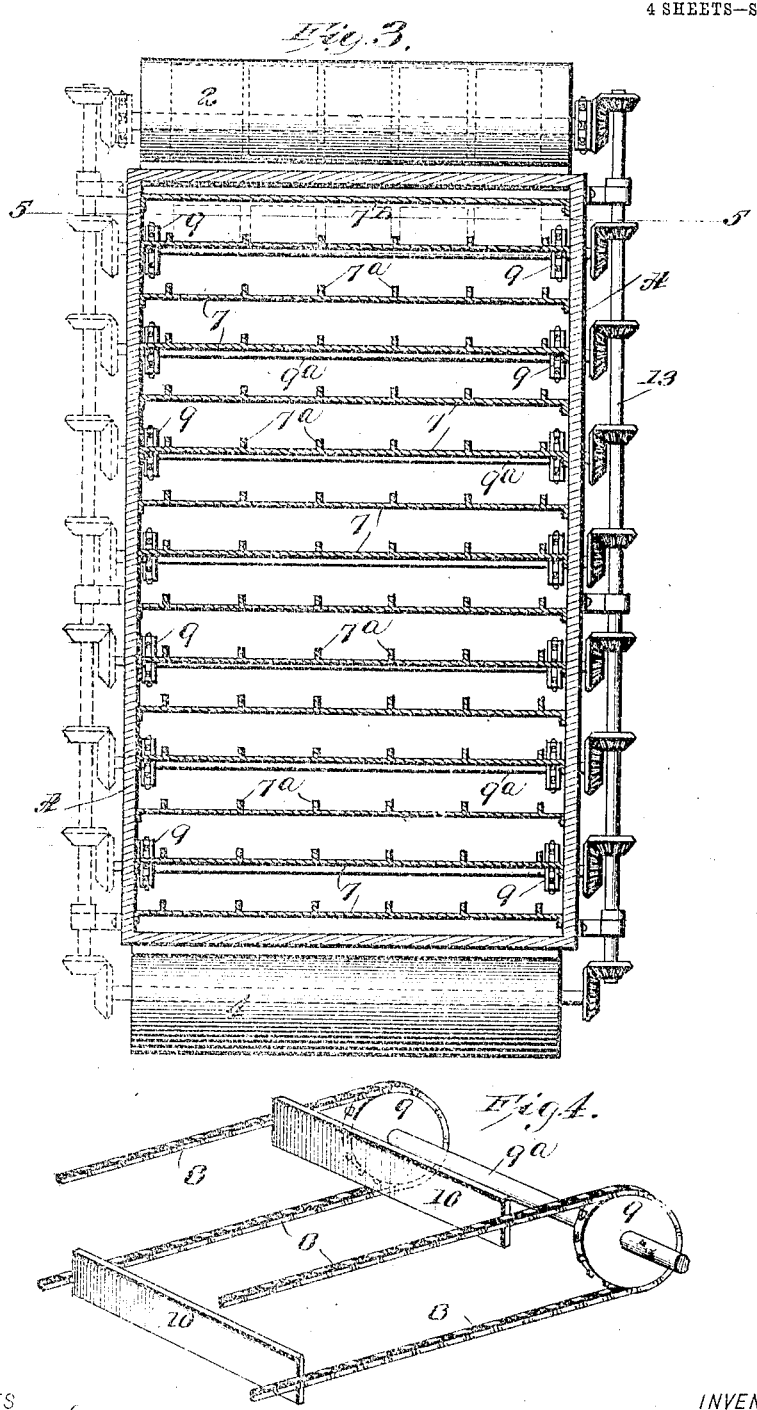
WITNESSES
INVENTOR
LEONARD S. FLECKENSTEIN.
BY
ATTORNEYS No. 851,511. PATENTED APR. 23, 1907.
L. S. FLECKENSTEIN.
APPARATUS FOR PROCESSING SUGAR CORN.
APPLICATION FILED JAN. 12, 1907.
4 SHEETS—SHEET 4.
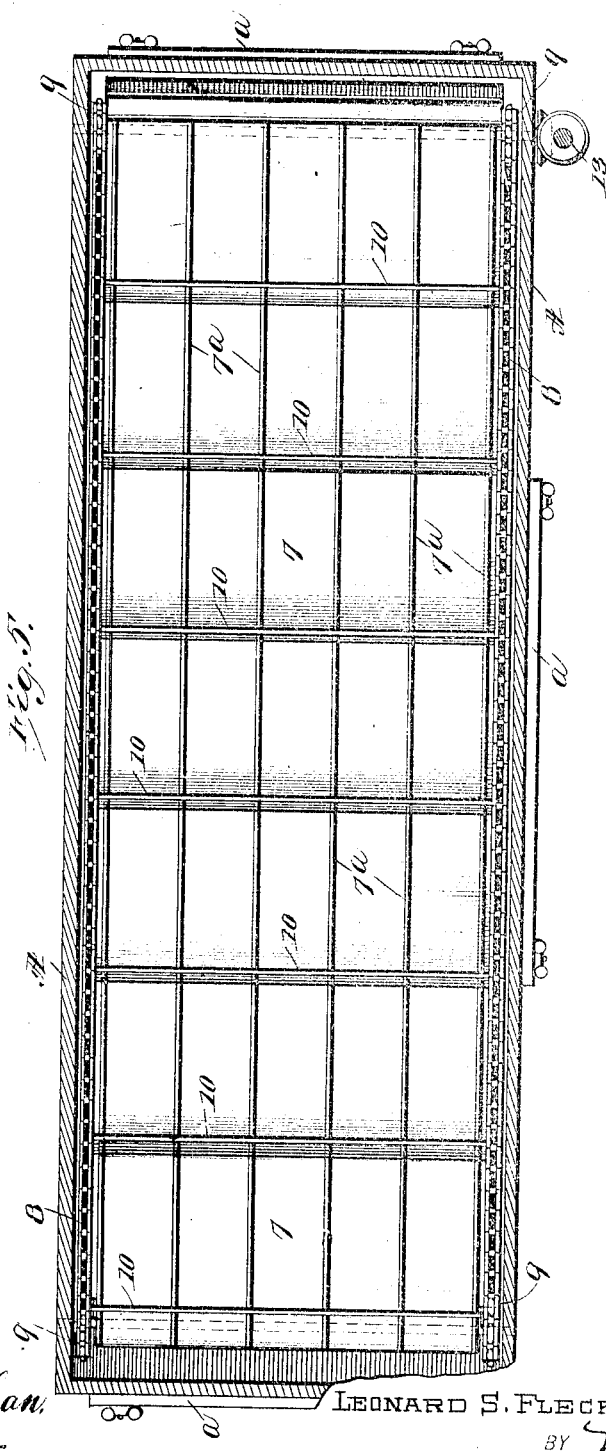
WITNESSES
E. M. Callaghan
Amos W. Hart
INVENTOR
LEONARD S. FLECKENSTEIN
BY Munn & Co.
ATTORNEYS

UNITED STATES PATENT OFFICE.

LEONARD S. FLECKENSTEIN, OF EASTON, MARYLAND.

APPARATUS FOR PROCESSING SUGAR-CORN.

No. 851,511.              Specification of Letters Patent.              Patented April 23, 1907.

Application filed January 12, 1907. Serial No. 351,9...

*To all whom it may concern:*

Be it known that I, LEONARD S. FLECKENSTEIN, a citizen of the United States, and a resident of Easton, in the county of Talbot and State of Maryland, have invented an Improved Apparatus for Processing Sugar-Corn, of which the following is a specification.

My invention is an apparatus designed and adapted for processing canned sugar-corn, or like products, by a continuous method, whereby the result is effected much more quickly and economically than by the apparatus and methods ordinarily employed.

The details of construction, arrangement, and combination of parts constituting my improved apparatus are as hereinafter described, and shown in the accompanying drawings, in which Figure 1 is a side view of the steam box or casing in which the processing is effected. Fig. 2 is in part a side view and in part a longitudinal section of the box or casing. Fig. 3 is a vertical section on the line 3—3 of Fig. 2. Fig. 4 is a perspective view illustrating a portion of one of the endless traveling conveyers. Fig. 5 is a longitudinal section on the line 5—5 of Fig. 3.

The steam tight box or casing A—see especially Fig. 1—in which the processing is effected, is oblong and rectangular, and provided with doors *a* in the side and ends, also with glazed inspection openings *b*, thermometers *c*, steam-gages *d*, and a safety-valve *e*. Steam is admitted by pipe B, preferably at two points as indicated. The cans containing corn or other goods as they come from the capper, are received at one of the upper corners of the box or casing A, and are delivered from the opposite lower corner of the same, this operation being effected by means of a rotatable cylinder 1 which is surrounded by a casing 2 and provided with a series of longitudinal grooves of a size adapted to receive a can. The discharge of cans is effected by a similar cylinder 3 in a casing 4, the cans passing out through an opening 5 into a cold water vat 6. The entire interior of the steam-box, or casing, A, is occupied by a series of tracks and endless traveling conveyers, the details of construction, arrangement and operation being as follows. The tracks 7 are arranged in a general horizontal position, or in other words traverse the steam chamber from end to end, and are arranged one above another, but separated by a space more than sufficient to accommodate the cans. Each of the tracks comprises a series of inclines projecting upward and downward, alternately, and arranged in pairs, each pair forming an obtuse angle. Thus two adjacent plane sections or portions of the track incline downward, and the adjacent pair upward to a corresponding height. In this way I form a track over which the cans roll first downward singly, and then upward doubly, and so on, and they are delivered at the end of each track to the one next below, and so on until finally delivered to the discharger 3 at the bottom of the steam chamber. For propelling the cans over these tracks from the entrance to the exit, I employ the conveyers constructed as shown in Figs. 2 and 4; thus, endless chains 8 run on sprocket wheels 9 mounted on transverse shafts $9^a$ at the ends of the steam chamber, and the said chains are connected transversely by flat bars 10, the same having sufficient width to ensure their contact with the cans at all times while traversing the tracks.

As shown in Fig. 2, a can has just been delivered on the first track 7 and another is about to leave the rotating cylinder 1. These two cans will obviously roll one at a time down the first incline of the track by gravity, and then they must be propelled up the succeeding incline by one of the bars 10, which thus serves as a pusher. Upon reaching the apex or top of the first upward incline, the first can passing over the same, rolls forward down the next incline, and then the second one follows and both the cans remain together in the center of the incline until the same push-bar 10 coming in contact with them, forces them up the succeeding incline, and so on throughout the whole series of inclines. Upon reaching the end of the track, say the first track shown in Fig. 2, the cans pass off the end of the track and fall upon the succeeding track. It will be noted that each alternate track is attached to the left hand end, or wall, of the steam chamber, and that the other intervening tracks are separated therefrom by a space sufficient to allow the downward passage of a can. It will be seen in Fig. 3 that the tracks 7 are provided with longitudinal guides 7ª between which the cans roll. It will be understood that a series of cans roll together over each of the numbered tracks, the number being in this case five in a row, the same being arranged and remaining in alinement as they roll, but the number may be varied. Thus five cans are simultaneously delivered into the steam chamber and five cans are simultaneously discharged therefrom by the respective grooved cylinders 1 and 3.

It will be observed that each endless conveyer composed of chains, cross bars, and sprocket wheels, serves for propelling the cans over two adjacent tracks, the upper run or bight of one set of chains being arranged above a track, and the corresponding run or bight of the same beneath such track; further, it will be seen that the sprocket wheels 9 are arranged at the sides of the steam chamber and that the shafts 9ª which carry the same are in each case located below the ends of the shorter tracks 7, so that they do not interfere with the passage of the cans from one track to another. In passing over the upward inclines of the track 7, the push bars 10 ride up on one incline and down the other, as will be readily understood.

In Fig. 2 a cover 7ᵇ for the first track or passageway is shown, the same serving the same purpose in respect to holding the cans in place and guiding them as each of the tracks proper effects for the track below.

The rotatable cylinder 3 is driven by a sprocket chain 11 from a shaft 12 mounted on the top of the box A, and the said cylinder 1 is operatively connected by mitre gears with a vertical shaft 13 arranged on the front side of the box A, the same being similarly geared with the lower cylinder 3, and, intermediately, the shaft 13 is similarly geared with each of the several transverse shafts 9ª on which the endless chains 8 run. Thus the two cylinders 1 and 3 and all the endless conveyers are driven from the same source of power and operate simultaneously.

By my improved apparatus, sugar-corn and like products may be processed without the aid of hand labor and in a much shorter time than by the usual apparatus. Heretofore it has generally required about 70 minutes to effect this result, while by my apparatus this may be done in about 35 minutes, besides producing a better grade of product, and effecting a comparatively large saving in labor and adjunctive apparatus, such as kettles, cranes, racks, and trucks. The cans admitted by the rotating cylinder 1, and delivered upon the first incline, roll down thereon, and the succeeding one also rolling down the same incline, comes in somewhat violent contact with the first one, and thereby the contents of the can are well shaken. A shaking again occurs upon passing the apexes of the upward inclines, and again in passing from one track on to another. Thus by jarring or shaking, as well as by rolling, the contents of the cans are shifted in such manner that the heat has access to all portions of the same. In other words, the heat is thus able to penetrate to the central portion of the can, or its contents, and this is done in less than half the time required in the old way. It has been demonstrated that if cans lie at rest, it requires from 45 to 48 minutes for steam heat to reach the central portions of the cans, under the ordinary pressure, whereas, when the cans are rolled and jarred or shaken, this may be effected in from 18 to 20 minutes. The temperature at which they are treated may be 250° F., so that the contents of the cans are thoroughly sterilized and thereby preserved indefinitely.

It is to be understood that the tracks 7 may be constructed of any preferred material, but material such as steel or iron, which combines cheapness with strength and comparative lightness, is to be preferred; and they may be galvanized if desired.

I claim:

1. The improved apparatus for the purpose specified comprising a steam-tight box, a can track having a succession of elevations, or portions projecting above its general plane, said elevations being separated by a space exceeding the diameter of the cans to be treated, and means for propelling the cans along the track and over the elevations from each of which they fall into a succeeding depression, whereby they are simultaneously rotated and jarred, as described.

2. In an apparatus for the purpose specified, the combination with a steam tight box, of a series of can tracks arranged therein, in general horizontal planes and parallel to each other, each being composed of a series of adjacent inclines arranged at an obtuse angle, each alternate track terminating short of the ends of the box, and means for pushing the cans over the tracks, whereby they pass off the end of one track on to the one below and then travel in the opposite direction, and so on throughout the series, substantially as described.

3. In an apparatus for the purpose specified, the combination with a steam tight box, of a can track arranged therein in a general horizontal plane and comprising alternately depressed and elevated portions over which the cans pass in part by gravity, and means for pushing the cans over the upwardly inclined portions, substantially as described.

4. In an apparatus for the purpose specified, the combination, with a steam tight box, of a series of can tracks arranged one above another and spaced from each other, and comprising alternately depressed and elevated portions, the depressed portion of one track being directly over the corresponding portion of another, and a series of endless conveyers
5 comprising endless chains, sprocket wheels and cross bars connecting the chains, the cross bars extending transversely in the passageways formed between adjacent tracks, and sliding in contact with the elevated portions of the latter, as shown and described.

LEONARD S. FLECKENSTEIN.

Witnesses:
J. PERCY AIKENHEAD,
FRANK A. WHITE.